United States Patent

[11] 3,629,736

[72] Inventors Donald Hirsch
Matawan;
Howard Clarence Meadors, Jr., Wayside,
both of N.J.

[21] Appl. No. 77,657
[22] Filed Oct. 2, 1970
[45] Patented Dec. 21, 1971
[73] Assignee Bell Telephone Laboratories, Incorporated
Murray Hill, N.J.

[54] SYSTEM FOR GENERATING INITIAL SETTINGS FOR AN AUTOMATIC TRANSVERSAL EQUALIZER
6 Claims, 2 Drawing Figs.

[52] U.S. Cl. .......... 333/18, 328/162
[51] Int. Cl. .......... H04b 3/04
[50] Field of Search .......... 333/18; 328/162, 163, 167

[56] References Cited
UNITED STATES PATENTS

| | | | |
|---|---|---|---|
| 3,283,063 | 11/1966 | Kawashina et al. | 333/18 UX |
| 3,375,473 | 3/1968 | Lucky | 333/18 |
| 3,403,340 | 9/1968 | Becker et al. | 333/18 X |
| 3,508,172 | 4/1970 | Kretzmer et al. | 333/18 |

*Primary Examiner*—Herman Karl Saalbach
*Assistant Examiner*—Paul L. Gensler
*Attorneys*—R. J. Guenther and Kenneth B. Hamlin ABSTRACT: In a transversal equalizer with tap multipliers whose settings are automatically controlled by the mean-square error difference between a predetermined transmitted work pattern and a receiver-generated identical pattern, an improvement in startup performance in the presence of high-level distortion is achieved by making incremental phase changes in the receiver timing on each failure of comparison between the two patterns. Further improvement is effected by resetting all tap multipliers, except a reference multiplier, to the zero condition when such comparison failures persist. Upon repeated failure for a predetermined number of occurrences the state of the receiver word generator is altered to conform to the most recently received segment of the transmitted work pattern thus attaining timing synchronization and initial equalizer adjustment simultaneously.

INVENTORS D. HIRSCH
H.C. MEADORS
BY
J.P. Kearns
ATTORNEY

SYSTEM FOR GENERATING INITIAL SETTINGS FOR AN AUTOMATIC TRANSVERSAL EQUALIZER

FIELD OF THE INVENTION

This invention relates to the time-domain equalization of data transmission systems and specifically to the expeditious attainment of initial synchronization and equalization in the presence of high distortion levels.

BACKGROUND OF THE INVENTION

In U.S. Pat. No. 3,403,340 issued to F. K. Becker et al. on Sept. 24, 1968, there is disclosed an automatic transversal equalizer for a data transmission system in which a mean-square error criterion is applied to the determination of tap coefficients. The mean-square error is computed from the differences between the responses of the distorting transmission channel and a reference filter to identical pseudorandom digital words of relatively long period. These words are separately generated at the respective transmitting and receiving terminals of the transmission system. In order for the error difference between the respective words to effect a meaningful correlation with the several tap outputs of the equalizer, the words must be synchronized with due regard to frequency offset and phase delay occasioned in the transmission channel. Becker et al. achieve such synchronization through a multistep method employing cross-correlation techniques implemented by motor-controlled resolvers. Needless to say, such a synchronization technique, while effective, is time consuming in execution.

It is accordingly an object of this invention to speed up the synchronization of random control words in automatic time-domain equalizers for data transmission systems.

It is another object of this invention to synchronize as expeditiously as possible a pseudorandom binary word sequence generated at the receiving end of a data transmission system with an identical transmitted sequence after relatively severe distortion by the transmission channel.

It is a further object of this invention to coordinate the synchronization of random word sequences generated at the respective transmitting and receiving terminals of a data transmission system for initial equalizer adjustment with the attainment of bit timing synchronization.

SUMMARY OF THE INVENTION

According to this invention, all the tap coefficients in a transversal equalizer, except one reference tap coefficient, are initially set to zero. Subsequently, for each failure of comparison between simultaneously observed transmitter and receiver generated word bits, receiver timing is incrementally adjusted. Where repeated comparison failures occur, and receiver timing has been advanced by a period comparable to a baud or symbol interval, further action is taken to prime the receiver word generator with a series of bits obtained from the transmitted word sequence. This latter action, in the absence of decision errors as to the nature of the received bits, obviates the relatively long search required to align the two sequences by repeated sampling time incrementation alone. Even when decision errors accompany the priming action, timing is adjusted as before and another priming action ensues automatically shortly thereafter.

It is an important feature of this invention that equalization and synchronization are accomplished concurrently, rather than in independent sequence, in a data transmission system.

BRIEF DESCRIPTION OF THE DRAWING

The above and other objects and features will be more fully appreciated by a consideration of the following detailed description and the drawing in which.

DETAILED DESCRIPTION

Figure 1:
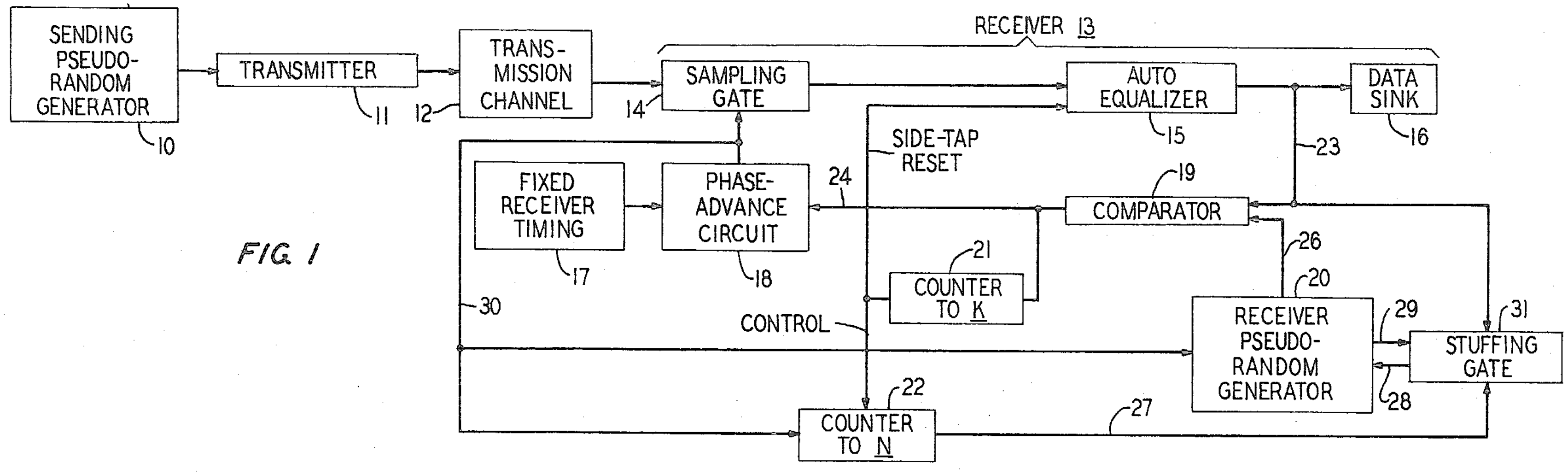
FIG. 1 is an overall block diagram of a data transmission system incorporating the mean-square equalizer and synchronization control apparatus according to this invention.

FIG. 1 is a block diagram of a representative digital data transmission system to which this invention is applied. Such a transmission system broadly comprises a transmitter 11, a channel 12 and a receiver 13. Practical transmission channels rarely possess the ideal attributes of flat amplitude and linear phase responses as functions of frequency over the transmission band of interest. Instead there exist such distorting factors as frequency offset and phase delay, which may be and often are, time varying in nature. Consequently, message signals introduced by transmitter 11 into the passband of channel 12 arrive at receiver 13 in a difficult-to-recognize condition. In order to overcome these undesirable conditions equalizers have been developed to aid in compensating for the distorting effects of the channel intervening between transmitter and receiver.

While fixed or compromise equalizers have been in use for many years, it is only recently that automatically adjustable equalizers have been available. An example of such an automatically adjustable equalizer is the mean-square equalizer of the type disclosed in the cited Becker et al. patent. The present invention is an improvement on the equalizer of the Becker type, specifically with respect to its initial adjustment in the presence of noise and high distortion levels. As taught by Becker et al. the difficulties inherent in equalizing data transmitted over highly distorting channels are overcome by the transmission of known repetitive data sequence or words through the transmission channel before message transmission and locally reproducing this same sequence or word at the receiver. The error information used for equalizer adjustment is derived from a bit-by-bit comparison of the two words. It is necessary that equivalent bits in the two words be compared in order for their difference to have meaning. It therefore follows that word synchronization is required as well as bit synchronization.

Where Becker et al. employ a servosystem for word synchronization, this invention proposes an all-digital system in which bit and word synchronization are jointly realized. Receiver 13 of FIG. 1 comprises an automatic equalizer 15, sampling gate 14, data sink 16, timing generator 17, phase advance circuit 18, pseudorandom word generator 20, comparator 19, counters 21 and 22 and stuffing gate 31. Equalizer 15 is of the Becker et al. type, and differs from it only in having a provision for resetting all side-tap attenuators to a neutral condition of zero transmission. Side taps are those other than a reference tap, at which the gain is substantially fixed at unity.

Sampling gate 14 is a coincidence gate periodically enabled by the receiver sampling clock wave. Data sink 16 is a conventional digital data utilization circuit, such as a computer or printout device. Receiver timing circuit 17 may comprise a crystal-controlled precision oscillator and countdown circuits. An example of such a generator is shown in FIG. 4 of our copending patent application bearing Ser. No. 19,270, filing date of Mar. 13, 1970 and the title "Digital Equalizer in Which Tap Adjusting Signals are Derived by Modifying the Signal Code Format." This application further discloses an all-digital implementation of the mean-square time-domain equalizer. The phase of the countdown of the timing circuit can be altered by phase advance circuit 18 which in effect deletes pulses in the countdown train of the circuit, thereby incrementing the sampling phase by small amounts.

Pseudorandom generator 20 generates the same word sequence at the receiver terminal that pseudorandom word generator 10 does at the transmitter terminal. Both generators are of the type disclosed in W. J. Cadden U.S. Pat. No. 2,951,230 issued Aug. 30, 1960. They are essentially recirculating shift registers with feedback from the output stage and at least one other stage to the input. The circulating data stream can exhibit a period up to $(2^n-1)$ bits in length, where $n$ is the number of stages. A seven-stage pseudorandom generator can thus develop a 127-bit word, as is contemplated in an illustrative embodiment of this invention. A sequence of this length appears to be essentially random to an equalizer having typically 13 taps, but since it repeats at 127-bit intervals it is designated as pseudorandom.

Normally in the Becker et al. type equalizer, the respective equalizer 15 and generator 20 outputs are algebraically combined and the sense or polarity of the combination is then correlated with each equalizer tap output to obtain adjustment signals for associated tap multipliers. Although not specifically shown in FIG. 1, this arrangement is also employed in the present equalizer after word synchronization has been realized to achieve final equalizer adjustment.

However, prior to such word synchronization the respective equalizer outputs on lead 23, containing the possibly distorted word sequence being generated at the transmitter terminal in generator 10, are compared with the outputs of generator 20 on lead 26 at the receiver terminal in comparator 19. Comparator 19 may advantageously be an exclusive-OR gate, the sense or polarity of whose output is determined by whether or not its inputs are of the same or opposite polarity. Thus, comparator 19 is not the same as the subtractor used to obtain error signals for tap coefficient control. The output of comparator 19 is applied to phase advance circuit 18 on lead 24 and directly to counter 21. Phase advance circuit 18 increments the phase of the sample timing wave by a predetermined arbitrary amount such as one-two hundred twentieth of a baud interval as discussed in our copending application, Ser. No. 19,270. Counter 21 provides an output after a predetermined number $k$ of counts. For convenience $k$ can be chosen for the illustrative system to be 220 in order to provide an output after the bit timing has been advanced one baud interval. Counter 21 drives a side-tap resetting circuit in equalizer 15 and a further counter 22.

The side-tap resetting circuit initializes the equalizer by returning all side-tap gain coefficients to zero and leaving the reference tap gain at its normal unity value. (Reference is made in this connection to U.S. Pat. No. 3,447,103 issued to E. Port on May 27, 1969 and entitled "System for Initially Adjusting a Signal Equalizing Device."

Counter 22, when triggered by the output of counter 21, provides an enabling signal to the count of N for stuffing gate 31. The count N is chosen to equal the number of shift-register stages embodied in pseudorandom generator 20. During the enabling period of counter 22 generator 20 is primed with the signals appearing in the output of equalizer 15 on lead 23.

Figure 2:
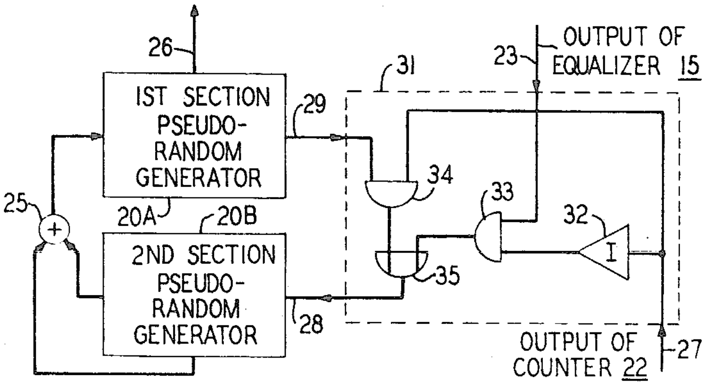
FIG. 2 is a block schematic diagram of an arrangement for priming the pseudorandom word generator in the receiver terminal to speed up initial equalization and synchronization according to this invention.

An illustrative interconnection over leads 28 and 29 between generator 20 and gate 31 is shown in more detail in FIG. 2. In FIG. 2 pseudorandom generator 20 is split into two sections 20A and 20B with illustratively three stages in block 20A and four stages in 20B. A feedback loop is arranged between the output of block 20B and an intermediate stage through exclusive-OR-gate 25, represented by the encircled plus sign. Normally the respective sections 20A and 20B are interconnected over leads 28 and 29 (also shown in FIG. 1) through AND-gate 34 and OR-gate 35 in stuffing gate 31. With such a connection the 127-bit word is repetitively produced. AND-gate 34 has a companion gate 33 the two of which are enabled in the alternative by the output of counter 22 on lead 27. For this purpose AND-gate 33 is connected to lead 27 through inverter 32. When AND-gate 33 is enabled during the counting period of counter 22, the feedthrough connection between sections 20A and 20B of generator 20 is broken and the output of equalizer 15 on lead 23 is introduced into generator 20. As previously, the count N is selected to match the number of stages in generator 20, in this case 7. Thus, the seven stages of generator 20 contains a series of seven consecutive bits taken from the output of equalizer 15 and in the absence of errors therein, the word from generator 20 is synchronized with the word from generator 10 in the transmitting terminal. Thereafter, equalization either proceeds to its conclusion and ready for adaptive control by message data or the stuffing cycle repeats until such conclusion is reached. The measure of success—one baud interval without a comparison failure—is adopted for convenience. Other measures may be employed.

While the equalizing and timing control system of this invention have been described in terms of a specific illustrative embodiment, it will be apparent to one skilled in the art to which it relates that the invention is susceptible to a wide range of modifications without departing from its spirit and scope.

What is claimed is:

1. In combination with a data transmission system including transmitter and receiver terminals, matching pseudorandom word generators at each of said terminals and a transversal equalizer at said receiver terminal: means for establishing initial bit and word synchronization between said terminals in the presence of high-level distortion in the associated transmission channel for said system comprising means for comparing individual bit positions of the respective pseudorandom words from said generators at the output of said equalizer, first means responsive to a plurality of comparison failures in said comparing means for setting the tap multipliers on said equalizer to the state which allows transmission at a reference tap only, second means responsive to each comparison failure in said comparing means for incrementally altering the timing of the word generator at the receiver terminal, and means responsive to said plurality of comparison failures for priming the word generator at said receiver terminal with a portion of the most recent received signal sequence in the output of said equalizer.

2. The combination according to claim 1 in which said comparing means is an exclusive-OR gate.

3. The combination according to claim 1 in which said second means comprises a stable oscillator having an output whose frequency is an integral multiple of the nominal timing frequency, a frequency divider in tandem with said oscillator having an overall division ratio equal to said integral multiple, and means for selectively deleting one or more pulses at an intermediate stage of said frequency divider.

4. The combination according to claim 1 in which said priming means comprises a transfer gate circuit for interconnecting intermediate stages of the word generator in said receiver terminal in the alternative to each other or to the output of said equalizer, said transfer gate circuit connecting the output of said equalizer to said word generator for the number of signaling intervals equal to the number of shift-register stages therein.

5. The combination according to claim 1 in which said priming means includes a counter activated upon the occurrence of said plurality of comparison failures in said comparing means and having a threshold count level equal to the number of stages in either of said word generators.

6. The combination according to claim 1 in which said first means includes a counter for registering said comparison failures, said counter having a threshold count level substantially equal to the number of incrementations of the timing phase of said receiver terminal word generator required to produce a displacement of one symbol interval.

* * * * *